(12) United States Patent  
Ziemer et al.

(10) Patent No.: US 8,992,362 B2
(45) Date of Patent: *Mar. 31, 2015

(54) HYBRID POWER TRAIN FOR A MOTOR VEHICLE

(71) Applicant: ZF Friedrichshafen AG, Friedrichshafen (DE)

(72) Inventors: Peter Ziemer, Tettnang (DE); Christian Sibla, Friedrichshafen (DE); Stefan Beck, Eriskirch (DE); Uwe Griesmeier, Markdorf (DE); Johannes Kaltenbach, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 12 days.

This patent is subject to a terminal disclaimer.

(21) Appl. No.: 13/754,826

(22) Filed: Jan. 30, 2013

(65) Prior Publication Data

US 2013/0196809 A1    Aug. 1, 2013

(30) Foreign Application Priority Data

Jan. 31, 2012   (DE) .......................... 10 2012 201 377

(51) Int. Cl.
  *F16H 3/72*    (2006.01)
  *F16H 37/06*   (2006.01)
  (Continued)

(52) U.S. Cl.
  CPC .............. *F16H 37/065* (2013.01); *B60K 6/365* (2013.01); *B60K 6/547* (2013.01); *F16H 3/725* (2013.01); *B60K 6/445* (2013.01); *B60K 6/48* (2013.01);
  (Continued)

(58) Field of Classification Search
  CPC ... F16H 37/065; F16H 3/66; F16H 2200/006; F16H 3/666; F16H 2200/2097
  USPC ............................................................ 475/5
  See application file for complete search history.

(56) References Cited

U.S. PATENT DOCUMENTS 5,106,352 A    4/1992  Lepelletier
6,425,841 B1 *  7/2002  Haka .............................. 475/275
(Continued)

FOREIGN PATENT DOCUMENTS

DE    10 2005 022 011 A1    12/2005
DE    10 2008 010 309 A1    10/2008
(Continued)

OTHER PUBLICATIONS

German Search Report from corresponding DE Application No. 10 2012 201 377.6, dated Mar. 27, 2014 (German Language) (5 pages).

*Primary Examiner* — Dirk Wright
(74) *Attorney, Agent, or Firm* — Brinks Gilson & Lione

(57) ABSTRACT

A transmission comprises an input shaft, an output shaft and at least two power paths between the input shaft and a driving gear set with a first, second, third and fourth shafts, wherein a first power paths has a first fixed gear ratio and a second of the power paths has a second fixed gear ratio smaller than the first fixed gear ratio. The first shaft can be fixed by a first gear-shifting element, and can be connected by a second-gear shifting element to the first power path. The second shaft can be connected by a third gear-shifting element to the first power path and by a fourth gear-shifting element to the second power path. The third shaft is permanently connected to the output shaft. The fourth shaft can be connected by a fifth gear-shifting element to the second power path and can be fixed by a sixth gear-shifting element.

12 Claims, 8 Drawing Sheets

(51) Int. Cl.
*B60K 6/365* (2007.10)
*B60K 6/547* (2007.10)
*B60K 6/445* (2007.10)
*B60K 6/48* (2007.10)
*F16H 3/66* (2006.01)
*B60K 6/26* (2007.10)

(52) U.S. Cl.
CPC ........... *F16H 3/663* (2013.01); *F16H 2200/006* (2013.01); *F16H 2200/201* (2013.01); *F16H 2200/2046* (2013.01); *B60K 2006/264* (2013.01); *B60K 2006/266* (2013.01)
USPC ............................................................ 475/5

(56) References Cited

U.S. PATENT DOCUMENTS

| | | | |
|---|---|---|---|
| 6,558,287 B2 * | 5/2003 | Hayabuchi et al. | 475/271 |
| 6,893,373 B2 * | 5/2005 | Kawamoto et al. | 475/302 |
| 6,905,434 B2 * | 6/2005 | Sugihara et al. | 475/276 |
| 7,029,416 B2 * | 4/2006 | Miyazaki et al. | 475/275 |
| 7,037,232 B2 * | 5/2006 | Ishimaru | 475/275 |
| 7,247,119 B2 * | 7/2007 | Andres | 475/275 |
| 7,354,376 B2 * | 4/2008 | Rihn et al. | 475/284 |
| 7,387,586 B2 * | 6/2008 | Raghavan et al. | 475/5 |
| 7,485,067 B2 * | 2/2009 | Park | 475/276 |
| 7,591,750 B2 * | 9/2009 | Bucknor et al. | 475/5 |
| 7,811,196 B2 * | 10/2010 | Hart et al. | 475/275 |
| 7,998,014 B2 * | 8/2011 | Hart et al. | 475/278 |
| 8,246,500 B2 | 8/2012 | Eto et al. | |
| 8,444,516 B2 * | 5/2013 | Tamai et al. | 475/5 |
| 8,485,930 B2 * | 7/2013 | Robinette et al. | 475/5 |
| 8,585,521 B2 * | 11/2013 | Robinette et al. | 475/5 |
| 2013/0196807 A1 * | 8/2013 | Ziemer | 475/5 |
| 2013/0196808 A1 * | 8/2013 | Ziemer | 475/5 |
| 2013/0196810 A1 * | 8/2013 | Ziemer | 475/5 |

FOREIGN PATENT DOCUMENTS

DE   10 2010 028 026        10/2011
EP        0 434 525 A1       6/1991

* cited by examiner

| gear | C | B | D | E | A | F | EM1,EM2 | gear ratio | gear step |
|---|---|---|---|---|---|---|---|---|---|
| 1VM + parking brake |  | O |  |  |  | O | M/Rek | 6,51 |  |
| 2VM |  |  | O |  |  | O | M/Rek | 3,97 | 1,64 |
| 3VM |  | O | O |  |  |  | M/Rek | 2,55 | 1,56 |
| 4VM |  |  | O |  | O |  | (-) | 1,64 | 1,55 |
| 5VM |  | O |  |  | O |  | M/Rek | 1,31 | 1,25 |
| 6VM |  |  |  | O | O |  | M/Rek | 1,00 | 1,31 |
| 7VM |  | O |  | O |  |  | M/Rek | 0,75 | 1,34 |
| 8VM | O |  |  |  |  |  | – | 0,64 | 1,16 |
| drive off |  |  |  |  |  | (O) | EM1 |  | ratio spread 10.1 |
| engine start |  | O |  | O |  |  | EM1(+EM2) | 2,56 |  |
|  |  |  |  |  |  | (O) | EM2 |  |  |

Fig. 4

| gear | C | B | D | E | A | F | U | V | EM1,EM2 | gear ratio | gear step |
|---|---|---|---|---|---|---|---|---|---|---|---|
| 1VM + parking brake |  | O |  |  |  | O | O |  | M/Rek | 6,51 | 1,64 |
| 2VM |  |  | O |  |  | O | O |  | M/Rek | 3,97 | 1,56 |
| 3VM |  | O | O |  |  |  | O |  | M/Rek | 2,55 | 1,55 |
| 4VM |  |  | O |  | O |  | (O) | (O) | (-) | 1,64 | 1,25 |
| 5VM |  | O |  |  | O |  |  | O | M/Rek | 1,31 | 1,31 |
| 6VM |  |  |  | O | O |  |  | O | M/Rek | 1,00 | 1,34 |
| 7VM |  | O |  | O |  |  |  | O | M/Rek | 0,75 | 1,16 |
| 8VM | O |  |  | O |  |  |  | O | - | 0,64 |  |
| drive off |  | O |  |  |  | O | O |  | 1 EM1 | 6,51 |  |
| drive off |  | O |  |  |  | O | O | O | 2 EM1 | 2,56 |  |
| engine start |  |  |  |  |  | (O) | (O) |  | EM1,EM2 |  |  |
|  |  |  |  |  |  | (O) |  |  | EM1,EM2 |  |  |
|  |  |  |  |  |  | (O) |  |  | EM2 |  |  |
|  |  |  |  |  |  |  |  |  |  | ratio spread 10,1 |  |

Fig. 6

| gear | C | B | D | E | A | F | | |
|---|---|---|---|---|---|---|---|---|
| 1VM + parking brake |  | O |  |  |  | O |  |  |
| 2VM |  |  | O |  |  | O |  |  |
| 3VM |  | O | O |  |  |  |  |  |
| 4VM | O |  | O |  |  |  |  |  |
| 5VM |  |  | O |  | O |  |  |  |
| 6VM | O |  |  |  | O |  |  |  |
| 7VM |  | O |  |  | O |  |  |  |
| 8VM |  |  |  | O |  |  |  |  |
| 9VM |  | O |  | O |  |  |  |  |
| 10VM | O |  |  | O |  |  |  |  |
| drive off |  |  |  |  |  | O |  | EM1 |
| engine start |  | O |  |  |  | (O) |  | EM1, EM2 |
|  |  |  |  |  |  | (O) |  | EM2 |

Fig. 8

HYBRID POWER TRAIN FOR A MOTOR VEHICLE

PRIORITY STATEMENT

This application claims the benefit of Germany Patent Application No. DE 10 2012 201 377.6, filed Jan. 31, 2012, the disclosure of which is incorporated herein in this application in its entirety by reference.

BACKGROUND

The invention relates to a transmission with a transmission input shaft and a transmission output shaft and two power paths between the transmission input shaft and a driving gear set with two planetary gear sets with four shafts that in the sequence of rotational speeds are referred to as the first, second, third and fourth shafts, wherein a first of said power paths has a first fixed gear ratio and a second power paths has a second fixed gear ratio, wherein the second fixed gear ratio is smaller than the first fixed gear ratio.

Furthermore the invention relates to a hybrid powertrain for an automotive vehicle comprising at least one internal-combustion engine and at least one electric machine A transmission of the kind mentioned is known, for example, from EP 0 434 525 A1. In the conventional transmission, which has five gear-shifting elements, whose selective paired intervention causes various gear ratios between the transmission input shaft and the transmission output shaft, there realized six forward gears and one reverse gear.

The patent application DE 10 2010 028 026 of the applicant also discloses a hybrid powertrain with a combustion engine and several electric motors. This hybrid powertrain uses one gear train with sub-gears, each having a shiftable gear. The shiftable gears provided in the sub-gears are engaged—apart from a direct gear with coaxial input and output—each with exactly one sub-gear, such as a spur-gear pair or a planetary gear. An eight-gear auxiliary transmission with coaxial output would then require for the eight gears at least eight sub-gears in the form of eight spur-gear pairs.

It is therefore the technical task of the invention to reduce the required construction outlay for a hybrid powertrain of the above-mentioned type with a multiple-gear transmission and to propose a load-shiftable transmission with at least eight gears, which allows high overall nips with very advantageous gear steps.

SUMMARY

According to the invention, this technical task is resolved with a transmission of the type mentioned in that at least one electric machine is connected to at least one of the shafts of the driving gear set, wherein the first shaft is fixable by a first gear-shifting element and can be connected to the first power path by a second gear-shifting element, wherein the second shaft can be connected to the first power path by a third gear-shifting element, and by a fourth gear-shifting element can be connected to the second power path, wherein the third shaft is permanently connected to the transmission output, and the fourth shaft can be connected by a fifth gear-shifting element to the second power path, and can be fixed by a sixth gear-shifting element.

The inventive solution is characterized mainly by a substantially reduced and simplified construction, which also allows an optimization with respect to the total weight and the necessary fitting space. Each two gear-shifting elements can be alternately operated by a double-acting actuator. Here, the closing of a first gear-shifting element can lead to the opening of a second gear-shifting element. All gear-shifting elements mentioned in this document can be formed as positive gear-shifting elements, for example as claw gear-switching element, in particular claw clutches or brakes. A further advantage of the inventive transmission is that the gear-shifting elements used do not require synchronization, because synchronization of the gear-shifting elements can take place by means of the electrical machine and a combustion engine in a load-free state. In addition, the electric machine can serve as engine-speed sensor (resolver). Here, undefined rotational speed at the planetary gear sets within and outside of the shifting of the gears can be avoided by the always defined rotational speeds of the electric motor at the input and the output. In addition, a load switching during the internal-combustion engine driving can be made by means of the electric motor.

The planetary gears used are designed as negative planetary gear sets. A simple negative planetary gear set includes a center gear, an internal ring gear, and a planet carrier, which are pivoted to the planetary gears that each meshes with the center gear and the internal ring gear. As a result, while the planet carrier is stopped, the internal ring gear has a direction of rotation opposite to that of the center gear. In contrast, a simple positive planetary gear set comprises one center gear, an internal ring gear, and a planet carrier, on which the inner and outer planetary gears are pivoted, wherein all inner planetary gears mesh with the gear center, and all external gears mesh with said internal ring gear, wherein each inner planetary gear meshes with one outer planetary gear. As a result, the planet carrier stopped, the internal ring gear has the same rotational direction as the center gear. According to the invention, however, a negative planetary gear set can also be replaced by a positive planetary gear set, if at the same time the link of the planet carrier and the link of the internal ring are exchanged and the amount of the stationary ratio of the planetary gear set compared to the execution as a negative planetary gear set is increased by 1.

An example embodiment of the invention, in which a start, picking up speed, reverse run, boosting, recuperation and load shifting is performed by the electric machine, is provided that the electric motor continuously or being switched on and off by gear-shifting elements, directly or through a transmission, is coupled to the first shaft of the driving gear. Another advantage can be seen that no separate reverse gear is required and with the sixth gear-shifting element closed, which is preferably implemented as a claw brake, a purely electric driving is possible.

One example embodiment of the invention, which manages with a low number of required gear-shifting elements, and avoids double gear shifting in sequential gear shifting, provides that selective pairwise engagement of the six gear-shifting elements allows to realize up to eleven forward gears, wherein eight or ten of the eleven forward gears can be load selected and selected free of group gear shifting, wherein said first forward gear is put in by closing the second gear-shifting element and the sixth gear-shifting element, the second forward gear is put in by closing the third gear-shifting element and the sixth gear-shifting element, the third forward gear is put in by closing the second gear-shifting element and the third gear-shifting element, wherein in the event that eight gears are selectable under load, the fourth forward gear is put in by closing the third gear-shifting element and the fifth gear-shifting element, the fifth gear is put it by closing the second gear-shifting elements and the fifth gear-shifting elements, and the sixth forward gear is put in by closing the fourth gear-shifting element and the fifth gear-shifting element, the seventh forward gear is put in by closing the second gear-shifting element and the fourth gear-shifting element, the eight forward gear is put in by closing the first gear-shifting element and the fourth gear-shifting element, wherein in the event that ten forward gears are selectable under load, the fourth forward gear is put in by closing the first gear-shifting element and the third gear-shifting element, the fifth forward gear is put in by closing the third gear-shifting element and the fifth-gear shifting element, the sixth forward gear is put in by closing the first gear-shifting element and the fifth gear-shifting element, the seventh forward gear is put by closing the second gear-shifting element and the fifth gear-shifting element, the eighth forward gear is put in by closing the fourth gear-shifting element and the fifth gear-shifting element, the ninth forward gear is put in by closing the second gear-shifting element and the fourth gear-shifting element, the tenth forward gear is put in by closing the first gear-shifting element and the fourth gear-shifting element.

Preferably, an eleventh forward gear or a ninth forward gear is put in by closing the fourth gear-shifting element and the sixth gear-shifting element.

An example embodiment provides that the transmission output shaft is arranged coaxial with the transmission input shaft and the first power path comprises an underdrive planetary gear set for delivering a rotational speed lower than the speed of the transmission input shaft and greater than zero, wherein a first shaft of the underdrive planetary gear set is always connected to the transmission input shaft and the second gear-shifting element and the third gear-shifting element are tied to a second shaft of the underdrive planetary gear, and a third shaft of the underdrive planetary gear set is fixed, wherein the second power path is a direct drive.

The underdrive planetary gear set is formed as a negative gear set, whose internal ring gear is fixed and whose center gear is constantly connected to the transmission input shaft or is detachably connectable to a seventh gear-shifting element, wherein, at its planet carrier, the third gear-shifting element and the second gear-shifting element are connected.

According to a particularly preferred example embodiment, which is characterized by low moments present in the gear-shifting elements and in the planetary gear sets, the first shaft of the driving gear set is connected to a center gear of the first individual planetary gear set of the driving gear set, wherein the second shaft of the driving gear set is connected to a planet carrier of the first individual planetary gear set and an individual internal ring gear of the second individual planetary gear set of the individual driving gear set, wherein the third shaft of the driving gear set is connected to an internal ring gear of the first planetary gear set and to a planet carrier of the second individual planetary gear set of the driving gear set, wherein the fourth shaft of the driving gear set is connected to a center gear of the second individual planetary gear set of the driving gear.

According to the invention, the above indicated technical task can also be resolved by a hybrid powertrain of the type mentioned in that it comprises a transmission according to example embodiments of the present application.

According to another example embodiment of the invention, at least one second electric motor can be provided in the form of a starter or starter-generator that is detachably connected to the combustion engine directly or by a transmission or over at least one eighth gear-shifting element. In this variant of the invention, there is the advantage that by opening the eighth gear-shifting element, a purely electric, load-shift-friendly driving in all gears is possible. When using a starter, there is the advantage that an engine start is possible during the purely electric driving mode (with closed sixth gear-shifting element) without any interruption. If instead of the starter a starter generator used, there arise the additional advantages that results in a battery-size-independent system, because a combustion engine-electric driving is possible. Also possible is a generator operation to brake the internal-combustion engine, in particular during the up-shift from the first to the second speed.

A pure electric driving in all gears as well as an engine start during the all-electric vehicle operation in all gears is possible without the slightest interruption of the pulling power, because the second electric machine is detachably connected to the internal-combustion engine by the eighth gear-shifting element, and is detachably connectable to the transmission input shaft by a further gear-shifting element.

A particularly simple and space-saving design results from the fact that in each case two gear-shifting elements are actuated by a double-acting actuator, wherein the first gear-shifting element and the second gear-shifting element and/or the third gear-shifting element and fourth gear-shifting element and/or the fifth gear-shifting element and the sixth gear-shifting element and/or the seventh gear-shifting element and the eighth gear-shifting element each can be operated by a double acting actuator.

BRIEF DESCRIPTION OF THE DRAWINGS

The invention together with further advantages will be explained in more detail below with reference to some non-limiting example embodiments, which are illustrated in the drawings. These diagrams show:

FIG. 4 is a gear-shifting diagram for the transmission shown in FIG. 1;

FIG. 6 is a gear-shifting diagram for the transmission shown in FIG. 5;

FIG. 8 is a gar-shifting diagram for a transmission corresponding to the rotational speed chart in FIG. 7.

DETAILED DESCRIPTION OF EXAMPLE EMBODIMENTS

In the introduction, it should be noted that in the various described example embodiments, the same parts are provided with the same reference numbers or same component designations, where the disclosure contained in the overall description can be transferred accordingly to the same parts with the same reference numbers and/or the same component designations.

Figure 1:
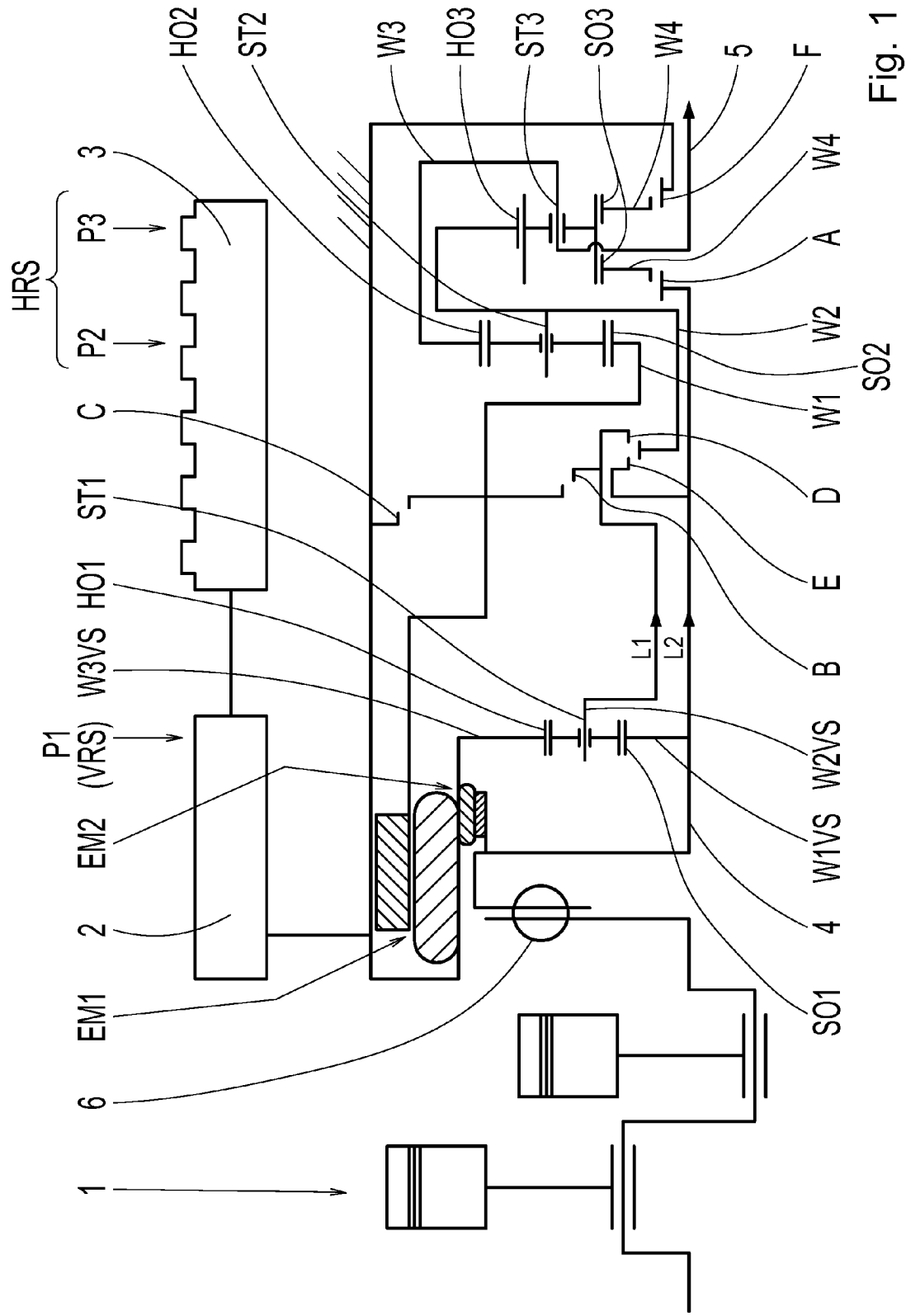
FIG. 1 shows a transmission schematic of a first example embodiment of an inventive hybrid powertrains with a novel transmission.
Figure 2:
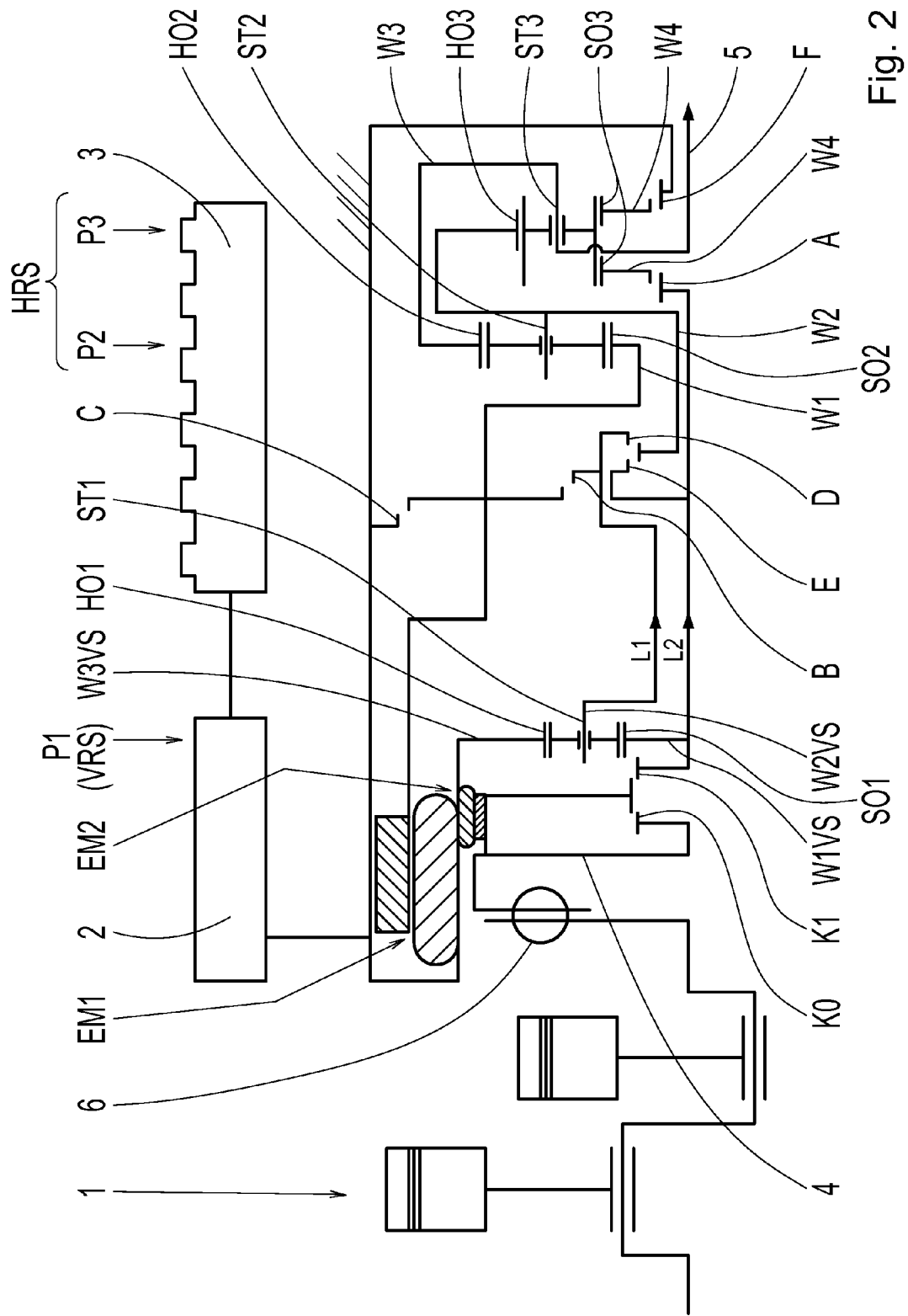
FIG. 2 shows a transmission schematic of a second example embodiment of an inventive hybrid powertrains with a novel transmission.

Referring to FIG. 1 and FIG. 2, an inventive hybrid powertrain for an automotive vehicle comprises an internal-combustion engine 1 and at least one electric machine EM1. In addition, a controller 2 for the electric machine EM1 and an electrical energy storage 3 may be provided.

The hybrid powertrain has an inventive transmission with a transmission input shaft 4 and a transmission output shaft 5. A torsional vibration damper 6 can be provided to damp vibrations between the engine 1 and the transmission. In addition, a second electric motor EM2 may be provided, for example, as a starter or starter generator. On the output side can be arranged an axle differential and/or distribution differential.

Between the transmission input shaft 4 and a driving gear set HRS, which consists of two individual planetary gear sets P2, P3, there are realized, as apparent from FIG. 1 and FIG. 2, two power paths L1 and L2. The two power paths L1 and L2 are two different transmission pathways for the rotational speed emitted by the transmission input shaft 4. The first power path L1 has a first fixed gear ratio i1 and the second power path L2 has a second fixed gear ratio i2, wherein the second fixed gear ratio i2 is smaller than the first fixed gear ratio i1.

The driving gear set HSR has, in the order of the rotational speeds, i.e., in their sequence in a rotational speed plan, four rotational shafts W1, W2, W3, W4 referred to as the first, second, third and fourth shafts, respectively.

The first shaft W1 can be fixed by means of a first gear-shifting element C, and can be connected by a second gear-shifting element B to the first power path L1. The second shaft W2 can be connected by a third gear-shifting element D to the first power path L1 and by a fourth gear-shifting element E to the second power path L2. The third shaft W3 is constantly connected to the transmission output shaft 5. At this point it should be mentioned that in the present text, the terms "fixed" or "non-rotatably" are used synonymously. The fourth shaft W4 can be connected by a fifth gear-shifting element A to the second power path L2, and can be fixed by a sixth gear-shifting element F.

Figure 5:
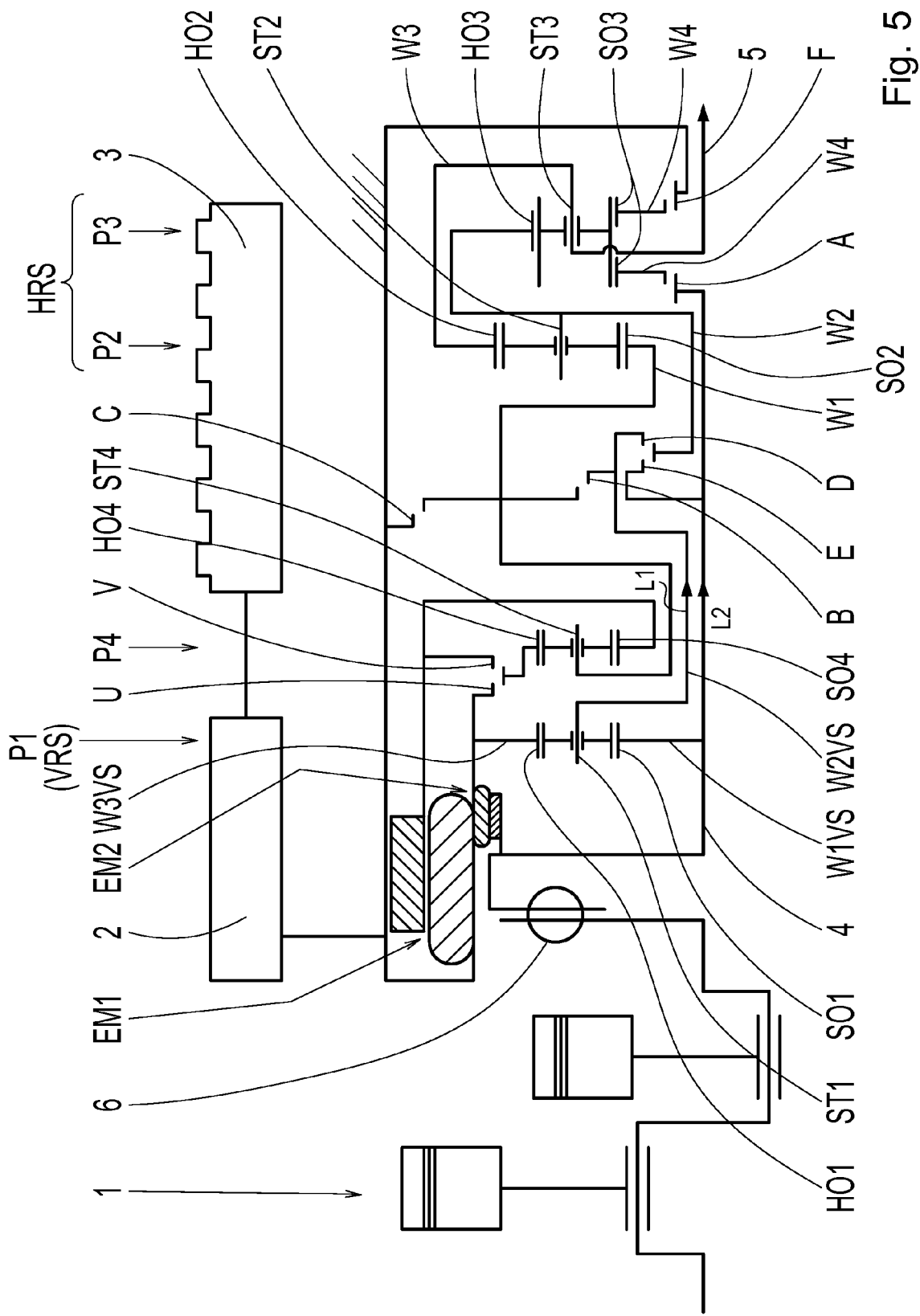
FIG. 5 shows a transmission schematic of a third example embodiment of an inventive hybrid powertrains with a novel transmission.

The first shaft W1 of the driving gear set HRS, as shown in FIGS. 1, 2 and 5, can be connected to a center gear S02 of the first individual planetary gear set P2 of the driving gear set HRS, wherein the second shaft W2 of the driving gear set HRS can be connected to a planet carrier ST2 of the first individual planetary gear set P2 and an internal ring gear H03 of the second individual planetary gear set P3 of the driving gear set HRS. The third shaft W3 of the driving gear set HRS that is connected to the transmission output shaft 5 can be connected to the internal ring gear H02 of the first individual planetary gear set P2 and to a planet carrier ST3 of the second individual planetary gear set P3, while the fourth shaft W4 of the driving gear set HRS can be connected with a center gear S03 of the second individual planetary gear set P3 of the driving gear set HRS. The implementation in the standard design style here is made possible by a split center gear S03 and a long planetary gear on the third individual planetary gear set P3.

For use in the front-transverse area, the driving gear set could be formed without the split center gear S03 or in the form of a Ravigneaux gear set.

In the case of the formation of the driving gear set HRS as a Ravigneaux gear set, the gear-shifting elements B and C could be connected to the first shaft W1, which is connected to a center gear of the negative gear set of the Ravigneaux gear set. The gear-shifting elements E and D could be tied to a common planet carrier, which is connected to the second shaft W2. The output could be made through the shaft W3, which is connected to a common internal ring gear. The gear-shifting elements A and F could be connected to a center gear of the positive gear set of the Ravigneaux gear set.

The driving gear set HSR could also be implemented in the Simpson design. Here, however, a design with a split internal ring gear and a long planetary gear would be advantageous to be able to couple the gear-shifting elements A and F to the internal ring gear, which comprises no further coupling and is connected to the fourth shaft. The gear-shifting elements B and C would in this case be connected to the common center gear, which is connected to the first shaft W1. The gear-shifting elements E and D would be coupled to the single planet carrier ST2, which is connected to the second shaft W2. The output would be made through the planet carrier-internal ring coupling W3.

The electric machine EM1 can be permanently connected to the first shaft W1 of the driving gear set HRS. As an alternative to a permanent connection, the electric machine EM1 can also be connected and disconnected, directly or through a transmission, in particular be connected to the first shaft W1 as a belt, chain, spur gear or planetary gear P4 (FIG. 5). In principle, the electric machine EM1 could also be connected switchable between the second shaft W2 and the fourth shafts W4. It would also be possible for the electric machine EM1 to only connect to the second shaft and, in addition, to connect a further electrical machine to the fourth shaft W4 to ensure the load switching.

The transmission output shaft 5 is arranged coaxially to the transmission input shaft 4, wherein the first power path L1 can comprise a ballast gear set in the form of an underdrive planetary gear set P1 for outputting a lower rotational speed than that of the transmission input shaft 4 and greater than zero.

A first shaft W1VS of the underdrive planetary gear set P1 can be permanently connected to the transmission input shaft 4. The second gear-shifting element B and the third gear-shifting element D are connected to a second shaft W2VS of the underdrive planetary gear set. A third shaft W3VS of the underdrive planetary gear set P1 is fixed, wherein the second power path L2 is a direct drive.

According to the illustrated example embodiment, the underdrive planetary gear set P1 can be configured as a negative gear set, whose internal ring gear HO1 is fixed and whose center gear SO1 of the transmission input shaft 4 is permanently connected or detachably connected. The third gear-shifting element D and the second gear-shifting element B may be attached to the planet carrier can ST1.

It should be also noted that it would also be possible to form the second power path L2 as an overdrive planetary gear set for delivering a rotational speed greater than that of the transmission input shaft 4, wherein the first power path L1 would be formed as a direct drive.

Selective paired engagement of the six gear-shifting element A, B, C, D, E, F of the transmissions allows to realize up to eleven forward gears, wherein eight or ten of the eleven forward gears can be selected under load and free of group shifting. The term "selected free of group shifting" is understood in the present context such that with a shift to a next higher or lower gear, only one gear-shifting element is opened and one other gear-shifting element is closed.

Figure 3:
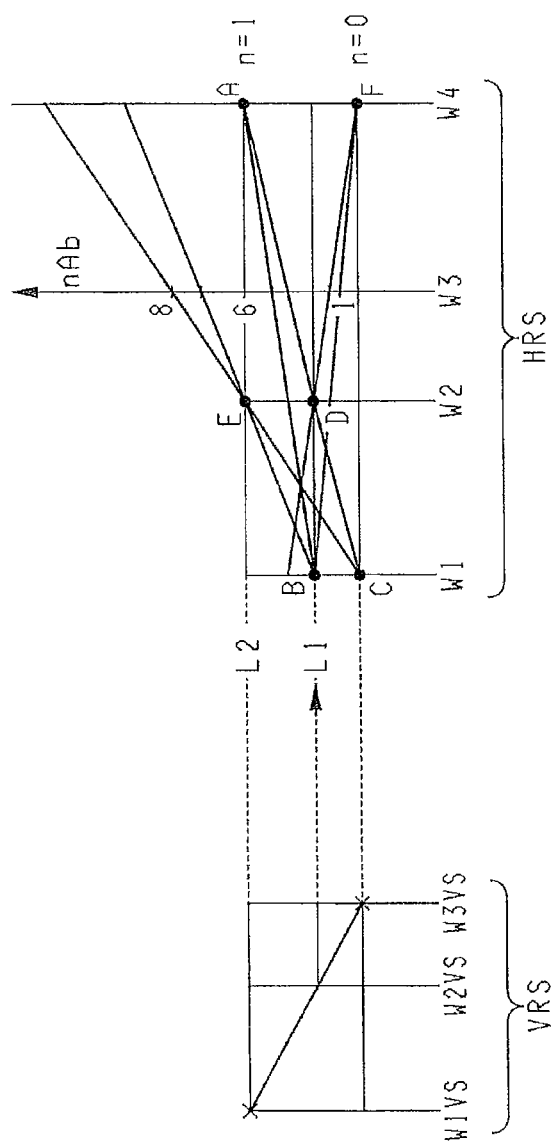
FIG. 3 shows a rotational speed diagram of an inventive transmission.
Figure 7:
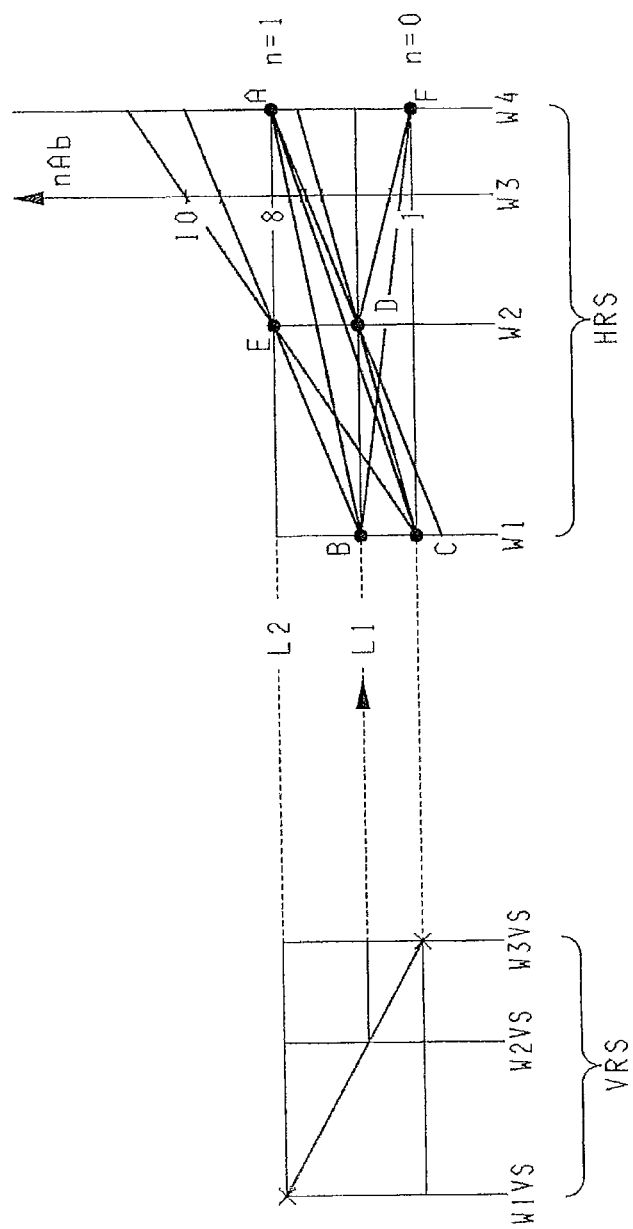
FIG. 7 shows a further rotational speed diagram for an inventive transmission.

The rotational speed diagrams or plans in FIGS. 3 and 7 illustrate the relationships between the gears put in by selective engagement of gear-shifting elements A, B, C, D, E, F, and the gear ratio of each shaft W1, W2, W3, W4. The speed ratios are plotted vertical direction on the individual shafts W1, W2, W3, W4. The horizontal distance between the shafts results from the gear ratios so that the speed ratios at a certain operation point can be connected by a straight line. With a given input, the eight (FIG. 3) and ten (FIG. 7) operation lines of the driving gear set HRS characterize the speed ratio situation in the eight or ten forward gears.

FIG. 4 shows an example of a gear-shifting diagram shown in FIG. 1 for the multiple-gear transmission, in which the closed gear-shifting elements are marked with circles. For each gear, two gear-shifting elements are closed. The gear-shift diagram clearly illustrates, by way of example, the respective ratios of the individual gears and the gear steps to the next higher gear that can be determined therefrom, wherein the transmission has a spread of 10.1. It becomes apparent from FIG. 4 that in sequential shifting, double gear shifting or group gear shifting can be avoided, because two adjacent gears jointly use one gear-shifting element. Typical values for the stationary ratios of the planetary gear P1, P2 and P3, which in the present example is designed as a negative planetary gear set, are −1.55 for P1, −1.8 for P2, and −1.8 for P3.

A first forward gear results from the closing the second gear-shifting element B and the sixth gear-shifting element F, a second forward gear results from closing the third gear-shifting element D and the sixth gear-shifting element F, a third forward gear results from closing the second gear-shifting element B and the third gear-shifting element D, a fourth forward gear results from closing the third gear-shifting element D and the fifth gear-shifting element A, a fifth forward gear results from closing the second gear-shifting elements B and the fifth gear-shifting elements A, a sixth forward gear results from closing the fourth gear-shifting element E and the fifth gear-shifting element A, a seventh forward gear results from closing the second gear-shifting element B and of the fourth gear-shifting element E, an eighth forward gear results from closing the first gear-shifting element C and the fourth gear-shifting element E. A ninth forward gear can be achieved by closing the fourth gear-shifting element E and the sixth-gear shifting element F. By dispensing with the first gear-shifting element C, a 7-speed transmission can be realized.

As shown in FIG. 5, the first shaft W1 of the driving gear set HRS can be connected to a planet carrier of another planetary gear set P4 upstream the driving gear set HRS. Two gear-shifting elements U and V are connected to an internal ring gear HO4 of the planetary gear set P4. Using the gear-shifting element U, which can be configured as a brake, the internal ring gear HO4 can be fixed and connected to the first electric machine EM1 by the gear-shifting element V, which is designed as a jaw clutch, wherein the electric motor EM1 is permanently connected to the center gear of the fourth planetary gear set P4.

FIG. 6 shows an example of a gear-shifting diagram for the hybrid powertrain shown in FIG. 5. The gear-shifting diagram clearly shows the respective gear ratios of each gear and the step to the next higher gear that can be determined therefrom, wherein the transmission also has a spread of 10.1. It is also apparent from FIG. 6 that with sequential gear-shifting method, double gear shifting or group gear shifting can also be avoided, because two adjacent gears jointly use one shifting element. In the first three gears, the gear-shifting element U is closed and the internal ring gear HO4 is fixed. In the fourth forward gear, the gear-shifting element U or the gear-shifting element V can be closed, wherein the speed of the first electric machine is approximately zero. In gears 5-8, the gear-shifting element V is closed and the internal ring gear HO4 is connected to the electric machine EM1.

As shown in FIG. 8, in the case that ten forward gears can be selected under load, the fourth forward gear is put in by closing the first gear-shifting element C and the third gear-shifting element D, the fifth forward gear is put in by closing the third gear-shifting element D and the fifth gear-shifting element A, the sixth forward gear is put in by closing the first gear-shifting element C and the fifth gear-shifting element A, the seventh forward gear is put in by closing the second gear-shifting element B and the fifth gear-shifting element A, the eight forward gear is put by closing the fourth gear-shifting element E and the fifth gear-shifting element A, the ninth forward gear is put in by closing the second gear-shifting element B and the fourth gear-shifting element E, the tenth forward gear is put in by closing the first gear-shifting element C and the fourth gear-shifting element E. An eleventh forward gear can be achieved by closing the fourth gear-shifting element E and the sixth gear-shifting element F.

As shown in FIG. 2, the second electric machine EM2 in the form of a starter or starter generator can be connected to the engine 1 by an eighth gear-shifting element K0. Alternatively, the second electric machine EM2 can be permanently connected to the engine 1. Moreover, the second electric motor connected by a seventh gear-shifting element K1 to the transmission input shaft 4. Opening the gear-shifting element K0 results in a pure electric, load-shiftable driving in all gears. Open gear-shifting element K0 and closed gear-shifting element K1 results in a combustion engine-electric driving.

The addition of the engine 1 is possible without interrupting traction even during the purely electric driving mode—with closed gear-shifting element F, which is designed as a claw brake. The engine 1 can be added without traction interruption after prior synchronization in the gears one to two, as well as in the gear that results from closing the sixth gear-shifting element F and the second gear-shifting element E.

As is apparent from the gear-shifting diagrams shown in FIGS. 4, 6 and 8, during the internal-combustion engine driving the load gear-shifting occurs by means of the electric motor EM1. In the case of a closed gear-shifting element F (shifting from the first gear to the second gear) or a closed gear-shifting element A (for example, at the shifting from the fifth gear to the sixth gear) in the electric motor mode, and in the case of a closed gear-shifting D element (shifting from the third gear to the fourth gear) or E (for example, when switching from the eighth gear to the ninth speed), wherein the engine 1 continues to be under load except for the case of closed gear-shifting element F.

The gear-shifting element F can be designed to start the engine 1 during the all-electric drive, and the gear-shifting element B can be closed after prior synchronization. Subsequently, the internal-combustion engine 1 can be started by the first electric motor EM1. Then, after prior synchronization, the claw brake F can be closed and (B and F being closed) in the first gear and the second gear (D and F being closed) internal-combustion engine driving can continue. Of course, internal-combustion engine driving with the internal-combustion engine 1 can also continue in all other gears, including in the gear that is not included in the gear-shifting logic (E and F closed) after appropriate synchronization.

It should be also noted here that in all the described example embodiments of the invention, the gear-shifting elements A, B, D, E, V as well as the gear-shifting elements K0, K1 are implemented as jaw clutches while the gear-shifting element C, F and U are formed as claw brakes. Also, in all example embodiments of the invention, the first gear-shifting element C and the second gear-shifting element B and/or the third gear-shifting element D and the fourth gear-shifting element E and/or the fifth gear-shifting element A and the sixth gear-shifting element F and/or the seventh gear-shifting element K1 and the eighth gear-shifting element K0 or the gear-shifting element U and V each can be actuated by a double-acting actuator. Thus, in each case a pair of gear-shifting elements can be actuated by a single actuator. Thus, the design is simplified and the space required and the production costs can be reduced.

As can further be seen from the FIGS. 4, 6 and 8, a purely electric driving in one gear or in two gears is also possible (forward/reverse start).

It is also possible to easily integrate a parking brake in the novel hybrid powertrain. For this purpose, for example when parking, the first gear (gear-shifting element B and F closed) can be inserted. The parking brake could be released in that the electric machine EM1 generates a moment against a slope force and the gear-shifting element B can be designed without load in order to be able to then start in electric mode.

The example embodiments show possible variants of the inventive transmission and the hybrid powertrain, when it should be noted at this stage that the invention is not limited to the specifically illustrated example embodiments. Various combinations of the individual variants are possible, and due to the technical teaching of the subject invention, these variations are within the ability of a person skilled in this technical field.

The invention claimed is:

1. A transmission comprising:
an input shaft;
an output shaft;
an electric motor;
a first power path between the input shaft and a driving gear set, having a first gear ratio; and
a second power path between the input shaft and the driving gear set, having a second gear ratio smaller than the first gear ratio;
the driving gear set comprising
a first planetary gear set and
a second planetary gear set, the first planetary gear set and the second planetary gear set having a plurality of shafts, the plurality of shafts comprising:
a first shaft, capable of being fixed by a first gear-shifting element and being connected by a second gear-shifting element to the first power path;
a second shaft, capable of being connected to the first power path by a third gear-shifting element and to the second power path by a fourth gear-shifting element;
a third shaft, being connected to the output shaft; and
a fourth shaft, capable of being connected to the second power path by a fifth gear-shifting element and fixed by a sixth gear-shifting element,
wherein at least one of the plurality of shafts is capable of being connected to the electric motor and the rotational speed of each of the plurality of shafts varies linearly with the rotational speed of each other of the plurality of shafts in increasing or decreasing rotational speed order of the first shaft, the second shaft, the third shaft, and the fourth shaft.

2. The transmission according to claim 1,
wherein the electric motor is either permanently connected to the first shaft or detachably connected via a shifting element to the first shaft, and wherein the electric motor is directly connected to the first shaft or indirectly connected via a transmission to the first shaft.

3. The transmission according to claim 1, further comprising eleven forward gears shiftable under load and shiftable free from group gear-shifting by selectively engaging two of the first, second, third, fourth, fifth, sixth, seventh, and eighth gear shifting elements, wherein
a first forward gear is operable by closing the second gear-shifting element and the sixth gear-shifting element;
a second forward gear is operable by closing the third gear-shifting element and the sixth gear-shifting element;
a third forward gear is operable by closing the second gear-shifting element and third gear-shifting element;
when eight of the eleven forward gears are shiftable under load,
a fourth forward gear is operable by closing the third gear-shifting element and the fifth gear-shifting element;
a fifth forward gear is operable by closing the second gear-shifting elements and the fifth gear-shifting elements;
a sixth forward gear is operable by closing the fourth gear-shifting element and the fifth gear-shifting element;
a seventh forward gear is operable by closing the second gear-shifting element and the fourth gear-shifting element;
an eighth forward gear is operable by closing the first gear-shifting element and the fourth gear-shifting element;
when ten of the eleven forward gears are under load,
the fourth forward gear is operable by closing the first gear-shifting element and the third gear-shifting element;
the fifth forward gear is operable by closing the third gear-shifting element and the fifth gear-shifting element;
the sixth forward gear is operable by closing the first gear-shifting element, and fifth gear-shifting element;
the seventh forward gear is operable by closing the second gear-shifting element and the fifth gear-shifting element;
the eighth forward gear is operable by closing the fourth gear-shifting element and the fifth gear-shifting element;
a ninth forward gear is operable by closing the second gear-shifting element and the fourth gear-shifting element; and
a tenth forward gear is operable closing the first gear-shifting element and the fourth gear-shifting element.

4. The transmission according to claim 3, wherein an eleventh forward gear or a ninth forward gear is operable by closing the fourth gear-shifting element and the sixth gear-shifting element.

5. The transmission according to claim 1, wherein
the output shaft is coaxial to the input shaft; and
the first power path comprises an underdrive planetary gear set for delivering a speed lower than a speed of the input shaft and greater than zero,
a first shaft of the underdrive planetary gear set is permanently connected to the transmission input shaft and the second gear-shifting element;
the third gear-shifting element is coupled to a second shaft of the underdrive planetary gear set; and
a third shaft of the underdrive planetary gear set is fixed;
wherein the second power path is a direct drive.

6. The transmission according to claim 5, wherein the underdrive planetary gear set is formed as a negative gear set and comprises:
an fixed internal ring gear
a center gear being permanently connected to the input shaft or being capable of being connected to the input shaft by a seventh gear-shifting element, and
a planet carrier coupled to the third gear-shifting element and the second gear-shifting element.

7. The transmission according to claim 1, wherein
the first shaft of the driving gear set is connected to a center gear of the first individual planetary gear set of the driving gear set, the second shaft of the driving gear set is connected to a planetary planet carrier of the first individual planetary gear set and an internal ring gear of the second individual gear set of the driving gear set, the third shaft of the driving gear set is connected to an internal ring gear of the first individual planetary gear set and a planet carrier of the second individual planetary gear set of the driving gear set, the fourth shaft of the driving gear set is connected to a center gear of the second individual planetary gear set of the driving set.

8. A hybrid powertrain for a motor vehicle, comprising
a combustion engine;
a first electric motor; and
a transmission, comprising:
 an input shaft;
 an output shaft;
 a first and a second power path between the input shaft and a driving gear set, having a first gear ratio;
 a second power path between the input shaft and the driving gear set, having a second gear ratio smaller than the first gear ratio;
 the driving gear set comprising
  a first planetary gear set and
  a second planetary gear set,
  the first planetary gear set and the second planetary gear set having a plurality of shafts capable of being connected to the electric motor, the plurality of shafts comprising:
   a first shaft, capable of being fixed by a first gear-shifting element and being connected by a gear-shifting element to the first power path;
   a second shaft, capable of being connected to the first power path by a third gear-shifting element and to the second power path by a fourth gear-shifting element;
   a third shaft, being connected to the output shaft; and
   a fourth shaft, capable to being connected to the second power path by a fifth gear-shifting element and fixed by a sixth gear-shifting element,
  wherein the rotational speed of each of the plurality of shafts varies linearly with the rotational speed of each other of the plurality of shafts such that:
   for a positive linear relation, the second shaft is configured to operate at a second-shaft rotational speed that is greater than or equal to a rotational speed of the first shaft, the third shaft is configured to operate at a third-shaft rotational speed that is greater than or equal to the second-shaft rotational speed, and the fourth shaft is configured to operate at a fourth-shaft rotational speed that is greater than or equal to the third-shaft rotational speed; and
   for a negative linear relation, the second-shaft rotational speed is less than or equal to the rotational speed of the first shaft, the third-shaft rotational speed is less than or equal to the second-shaft rotational speed, and the fourth-shaft rotational speed is less than or equal to the third-shaft rotational speed.

9. The hybrid powertrain according to claim 8, further comprising a second electric motor directly connected to the combustion engine or indirectly connected through a transmission to the combustion engine, or releasably connectable to the combustion engine by an eighth gear-shifting element.

10. The hybrid powertrain according to claim 9, wherein the second electric machine is releasably connectable by the eighth gear-shifting element to the internal-combustion engine and is releasably connectable by a further gear-shifting element to the transmission input shaft.

11. The hybrid powertrain according to claim 8, further comprises a double-acting actuator to actuate at least one pair of
 the first gear-shifting element and the second gear-shifting element;
 the third gear-shifting element and the fourth gear-shifting element;
 the fifth gear-shifting element and the sixth gear-shifting element; and
 the seventh gear-shifting element and the eighth gear-shifting element.

12. A transmission comprising:
an input shaft;
an output shaft;
an electric motor; and
a driving gear set comprising:
 a first planetary gear set,
 a second planetary gear set adjacent to the first planetary gear set, the first and second gear sets comprising:
 a first shaft connected to the electric motor and capable of being fixed by a first gear-shift element and capable of being connected to a first power path via a second gear-shift element;
 a second shaft connected to an internal ring gear of the second planetary gear set, wherein the second shaft is coaxial with the first shaft, wherein the second shaft is capable of being connected to the first power path via a third gear shifting element and capable of being connected to a second power path via a fourth shifting element;
 a third shaft connected to the output shaft, an internal ring gear of the first planetary gear set, and a planet carrier of the second planetary gear set; and
 a fourth shaft connecting to a center gear of the second planetary gear set, capable of being connected to the second power path via a fifth gear-shifting element and capable of being fixed by a sixth gear-shifting element,
wherein the rotational speed of the first shaft varies linearly with the rotational speed of the second shaft, the rotational speed of the third shaft, and the rotational speed of the fourth shaft, such that:
 the rotational speed of the fourth shaft is greater than or equal to the rotational speed of the third shaft, the rotational speed of the third shaft is greater than or equal to the rotational speed of the second shaft, and the rotational speed of the second shaft is greater than or equal to the rotational speed of the first shaft; or
 the rotational speed of the fourth shaft is less than or equal to the rotational speed of the third shaft, the rotational speed of the third shaft is less than or equal to the rotational speed of the second shaft, and the rotational speed of the second shaft is less than or equal to the rotational speed of the first shaft.

* * * * *